April 1, 1958   M. J. E. GOLAY   2,829,275
PHASE-NULLING RADIATION COMPARISON SYSTEM
Filed Nov. 12, 1954   3 Sheets-Sheet 1

INVENTOR.
MARCEL J.E. GOLAY
BY
John W. McLaren
ATTORNEY

April 1, 1958  M. J. E. GOLAY  2,829,275
PHASE-NULLING RADIATION COMPARISON SYSTEM
Filed Nov. 12, 1954  3 Sheets-Sheet 2

INVENTOR.
MARCEL J. E. GOLAY
BY
ATTORNEY

April 1, 1958     M. J. E. GOLAY     2,829,275
PHASE-NULLING RADIATION COMPARISON SYSTEM
Filed Nov. 12, 1954     3 Sheets-Sheet 3
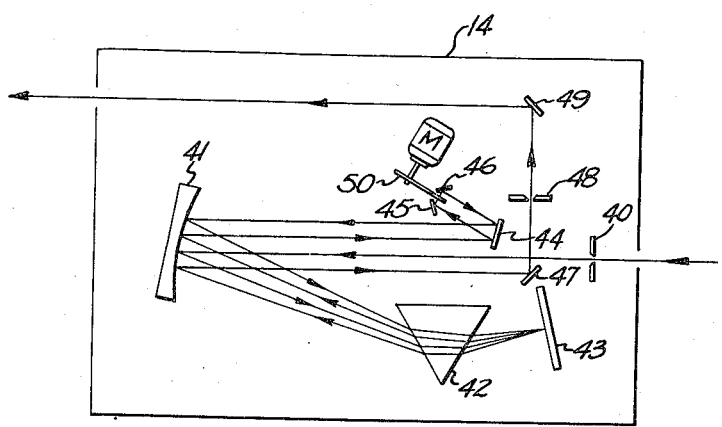
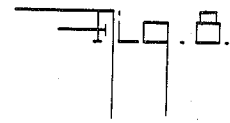
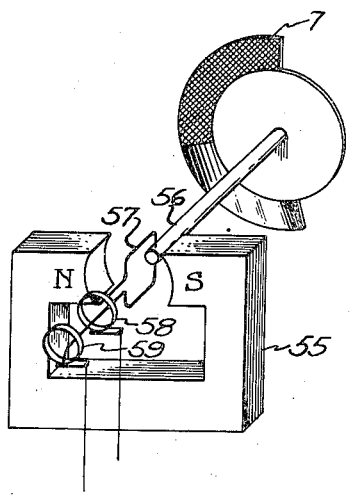
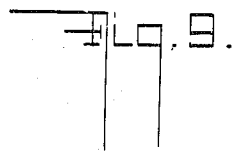
INVENTOR.
MARCEL J.E. GOLAY
BY
ATTORNEY United States Patent Office 2,829,275
Patented Apr. 1, 1958

2,829,275

PHASE-NULLING RADIATION COMPARISON SYSTEM

Marcel J. E. Golay, Rumson, N. J., assignor to The Perkin-Elmer Corporation, Norwalk, Conn., a corporation of New York Application November 12, 1954, Serial No. 468,278

14 Claims. (Cl. 250—220)

This invention relates to an improved radiation comparison system and is particularly concerned with the accurate measurement of the ratio of the intensity of two beams of radiation.

Numerous substances have characteristic absorption spectra as revealed by the absorption of radiation energy by each throughout a selected range of wavelengths. Several types of spectrometric instruments have been devised which will automatically measure and record these characteristic absorption spectra as a function of wavelength.

In order to obtain the characteristic spectral transmission of a substance without the contamination which could be caused by the presence of other substances in the path of the radiation, such as atmospheric water vapor or carbon dioxide, or which could be also caused by a non-uniformity of emission of the source of radiation used for such measurements, a number of comparison systems have been devised which employ two radiation beams. In such systems the intensity of a nearly monochromatic beam of radiation passed by the sample under investigation is compared to the intensity of a similar beam of radiation emanating from the same source but not passed through the sample. These beams may be referred to as the sample beam and the reference beam, respectively. The difference in intensity of these beams may be detected and the difference signal used to actuate a beam attenuation device to bring the detected beam intensities into balance. The amount of attenuation necessary to equalize the intensities of the detected beams is substantially a function of the ratio of intensity of the beams due to absorption by the sample substance. The measure of the ratio thus obtained depends not only upon the position of the attenuating device, but also upon its geometrical shape.

Such prior art systems customarily have involved the actual interposition of radiation opaque means in the path of the reference beam to effect a beam intensity null and those familiar with spectroscopy problems will appreciate that there are distinct advantages inherent in a system which obviates the necessity for such radiation attenuation.

The present invention makes possible a system in which two radiation beams are compared and the ratio of their intensities is measured without attenuating or interferring in any way with the reference beam as heretofore had been the common practice.

In accordance with the present invention, the radiation absorption by the sample substance is measured as a phase displacement of the alternating current component of the detected radiation intensity signal from a known reference signal of the same frequency; the detected phase signal is employed to continuously adjust the phase of the reference signal to maintain a predetermined phase relative to the alternating component of the radiation intensity signal and the amount of such phase adjustment is a measure of the ratio of intensity of one beam to the other. The ratio measurement is thus accomplished without in any way attenuating the stronger beam or nulling the two beams. The present system may, therefore, be called a phase-nulling radiation comparison system.

A principal object of the present invention is to measure the ratio of intensity of two beams of radiation with significantly improved accuracy.

A further object of the present invention is to measure the ratio of intensity of two beams of radiation without operating upon either beam to equalize their intensities.

Another object of the present invention is to measure the ratio of intensity of two beams of radiation at the most favorable signal-to-noise ratio.

Another object of the present invention is to avoid the contamination of scattered radiation in the signal measured.

The advantages and features of the present invention will be better understood from the description of the operation of a typical embodiment as illustrated in the drawings in which, Fig. 1 is a schematic diagram of a double-beam, phase-nulling spectrophotometer embodying the present invention, Fig. 2 is an elevational view of the beam-switching and reference signal generator device utilized in the embodiment of Fig. 1, Fig. 3 is a waveform illustrating the radiation signals generated in a system operating in accordance with the present invention, Fig. 4 is a vector diagram illustrating the vectorial and phase relationships of signals generated in a system operating in accordance with the present invention, Fig. 5 is a vector diagram illustrating the vectorial and phase relationships of signals generated in a particular embodiment of the present invention.

Fig. 8 is a detailed schematic illustration of the monochromator 14 shown in Fig. 1, and Fig. 9 is a schematic representation of an inductive-type reference signal generator.

Figure 1:
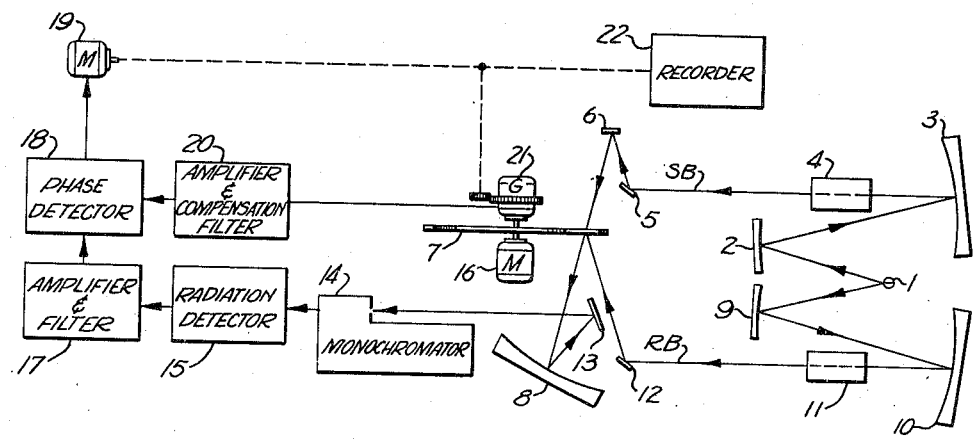

The embodiment illustrated by Fig. 1 is a double beam, phase-nulling spectrophotometer in which a beam of nearly monochromatic radiation is passed through a sample, and another beam of nearly monochromatic radiation of the same wavelength as the first and generated by the same source, but not weakened by passage through a sample, are successively directed to a common path through a monochromator which separates these beams from other radiations. The two periods during which the two beams are successively directed to the monochromator are followed by a third period during which both beams are blocked. The radiation signals emerging from the monochromator are detected by a radiation-sensitive device which may be a thermocouple, for instance. A signal is thus produced which is a function of the instantaneous intensity of the radiation and has an alternating component of a frequency related to the beam-switching frequency and the phase of which varies substantially as the ratio of the intensity of the two beams.

The intensity ratio is determined by comparing the phase of the alternating component of the radiation detector output with the known or determinable phase of a reference alternating current electrical signal of the same frequency. A null is achieved in the system by adjusting the phase of the reference signal so as to maintain a predetermined phase relationship with the alternating component of the signal generated by the radiation-sensitive detector. This adjustment can be made automatically by means of a servomotor, and can be used to actuate a recording device so that an accurate relationship exists between the data recorded and the ratio of the intensity of the sample beam to the reference beam. Thus, a phase null indicative of the ratio of intensity of two radiation beams due to radiation absorption in one of the beams is produced by a system operating in accordance with the present invention through the use of a closed servo-mechanism loop which does not include either of the beams as had many prior art systems.

The operation of an embodiment of the present invention will be explained in greater detail with reference to Fig. 1, in which a beam of radiation designated as the sample beam SB is generated by a source 1, focussed by means of convergent mirrors 2 and 3, and passed through sample cell 4 which contains a sample of the substance under investigation. A mirror 5 redirects the sample beam SB thus passed by sample cell 4 to mirror 6, which in turn reflects it on a path towards mirror 8. The sample beam SB will reach mirror 8 when the path is not blocked by a rotating disc 7.

A second beam, designated as the reference beam RB, is generated by the same source 1, focussed by means of convergent mirrors 9 and 10, and directed through a reference cell 11 onto a mirror 12. Reference cell 11 serves as a compensating element by equalizing the length of airpath traversed by both beams and providing a balance in both beams of that amount of radiation absorption which may be attributable to the cells themselves, so that the resultant ratio of intensity of the two beams which is detected will be essentially a measure of the absorption by the sample substance in the sample cell.

Figures 2, 4, 5:
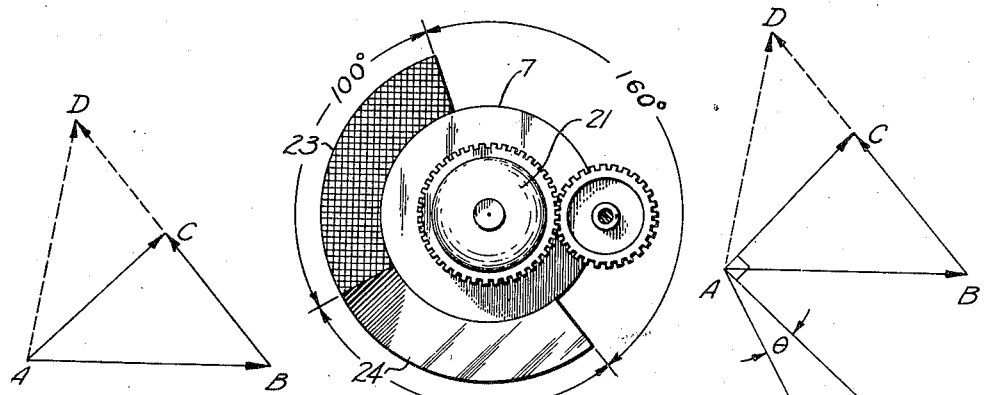

Mirror 12 directs the reference beam RB toward disc 7 which is rotatably driven by a motor 16 and has a configuration such as that shown in the elevational view of Fig. 2. It will be noted that the disc 7 comprises three segmented portions about an annular area of its periphery, each of which performs a different function as it intercepts the reference beam RB and/or the sample beam SB. One portion of the disc 7 is a 100° reflective sector 24 which reflects the reference beam to mirror 8, while blocking the sample beam SB; another portion is a 100° non-reflective sector 23 which blocks both beams; and the remaining 160° portion is a cut-away segment positioned so as to allow only the sample beam SB to reach mirror 8. The rotating disc 7 thus performs the functions of switching the remainder of the system from one beam to the other and then blocking both beams.

From disc 7 on throughout the system, those portions of the sample beam SB and the reference beam RB which are eventually detected and measured, follow the same optical path. Those portions of the sample beam SB and the reference beam RB which reach convergent mirror 8 are reflected to mirror 13, which redirects them to a monochromator 14, on the entrance slit of which a second image of source 1 is formed. Monochromator 14 selects from the sample beam SB and the reference beam RB a discrete spectral component characterized by a small range of wavelengths which is the same for both beams. Emerging from the monochromator, the spectral components thus selected are caused to impinge upon a radiation-sensitive detector 15, the output of which is substantially commensurate with the instantaneous intensity of the received energy. In a typical embodiment of the present invention, a thermocouple produces an electrical output in accordance with instantaneous variations of the detected radiant energy. Such an output will have an alternating component of a frequency related to the rotational speed of disc 7.

The alternating component of the signals produced by detector 15 is amplified and filtered selectively with respect to its fundamental frequency by an amplifier-filter 17, the alternating current output of which is fed to a phase detector 18. A second input to the phase detector 18 is an alternating current reference signal of the same frequency and known or determinable phase which is compared to the alternating radiation intensity signal to produce an output signal as a measure of the deviation of the two inputs from a predetermined phase relationship which may be a quadrature relationship, for instance. The reference signal is generated by a generator 21 the details of which are illustrated schematically in Fig. 9. The generator for developing an electrical reference signal may comprise a stator 55 in the form of a permanent magnet as illustrated and a rotor 56 assembly driven in synchronism with the chopping disc 7. Alternating current signals are developed by the rotation of the inductive element, coil 57, through the magnetic field which exists in the gap between poles of the stator 55. Slip rings 58 and 59 are provided to connect the reference signal to the phase detector 18 of Fig. 1 after appropriate filtering and amplification in the amplifier-filter 20 of Fig. 1. Such reference signals are always in synchronism with the beam-switching and chopping operation performed by disc 7 regardless of rotation speed, because of the common drive means, motor 16 as shown in Fig. 1.

From Fig. 9 it is apparent that the stator 55 may be arranged to be rotationally adjustable about the axis of rotation of the reference signal generating element, coil 57, and the phase of the alternating current reference signal may be made to advance or retard with respect to the beam-switching and chopping operation of disc 7, yet remaining synchronous.

The phase of the fundamental frequency of the reference signal produced by generator 21 is, therefore, commensurate with the angular displacement of its adjustable stator 55 about the rotational axis of disc 7. The fundamental frequency of the signal thus generated is filtered and amplified in amplifier and compensating filter 20, and its output constitutes the reference signal fed to phase detector 18. The output of phase detector 18 controls the operation of a servomotor 19 which positions the stator 55 of generator 21 through appropriate linkage as schematically represented in Fig. 1.

It is well known in the art that the amplification of amplifier 20 and the sense of the output of phase detector 18 may be adjusted so that the adjustment of the phase of the reference signal continuously nulls the deviation of the reference signal from a predetermined phase relationship with respect to the alternating component of the radiation signal. It is also well known in the art that the degree of filtering of the amplifier and compensating filter 20 may be adjusted so that variations in the speed of the motor 16 will cause no change in the relative phase of the two signals fed to phase detector 18 (if other conditions such as absorption, etc. remain unchanged).

Figure 3:
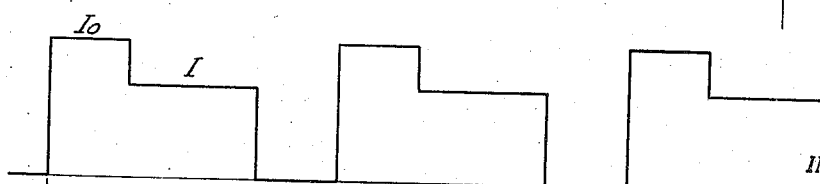

The waveform shown in Fig. 3 represents the variation of radiation intensity versus time which reaches the radiation sensitive device of the system, such as a thermocouple. The cyclic period of operation is indicated along the abscissa as "$t$."

It will be noted from Fig. 3 that the reference beam RB represented by a radiation intensity amplitude of $I_0$ is passed through the system for a different period of time than the sample beam SB which is represented by a radiation intensity amplitude of $I$. In accordance with the configuration of the beam-switching device of Fig. 2, the reference beam radiation, $I_0$, is passed during 100° of each cycle of operation, the sample beam radiation, $I$, during 160° of each cycle, and both beams are blocked for the remaining 100° of each cycle. It is possible, therefore, that a sample beam which has comparatively little or no energy absorbed from it may contain more total radiation energy during a cyclic period than the reference beam. This is a unique feature of operation of the present invention which is perhaps more clearly seen from the vector diagram of Fig. 4 where the vectors corresponding to typically illustrative reference beam and sample beam components of the fundamental frequency detected in the system have amplitudes representative of cyclic energy rather than instantaneous intensity.

In Fig. 4, the fundamental frequency detected by the radiation detector is represented by the vector AC. The vector AC is comprised of two components which are vectorially represented by AB and BC. These components are consistent with the successive contributions in terms of total energy of the reference beam RB and the sample beam SB to the fundamental frequency signal which result from the operation of disc 7 by which (1) the reference beam RB passes through the monochromator while the sample beam SB does not, (2) the sample beam SB passes through the monochromator while reference beam RB is blocked, and (3) both the reference beam RB and the sample beam SB are blocked from the monochromator.

Because of the fact that, under these operating conditions, the sample beam component vector may conceivably contribute more total energy to the resultant vector than the reference beam component vector, it may attain an amplitude of the order represented by vector BD in which event the resultant vector AD would be displaced 80° from the reference beam component vector. If the energy in the sample beam were totally absorbed, the resultant vector would, of course, coincide with the reference beam component vector both in amplitude and phase. The extreme limits of variation of the resultant vector, therefore, are seen to span substantially 80° of phase.

In accordance with the concept of the present invention, the cyclic period during which each of the components contribute to the resultant vector may be chosen so as to minimize the contribution of noise to the fundamental frequency detected by the radiation detector and, therefore, improve the signal-to-noise ratio of the system. This flexibility of design is a most desirable feature of the present invention and further enhances the accuracy of measurement which may be achieved by a system operating in accordance with the principles disclosed herein.

Fig. 5 illustrates the vector relationships of signals developed in accordance with the present invention where the reference signal is represented by vector AF. In this particular system, phase nulling is achieved when the fundamental frequency of the radiation signals, represented by vector AC, and the reference signal are in quadrature. The reference signal is corrected in phase through an angle $\theta$ to the position shown at AF′ so as to be in quadrature with the fundamental frequency vector AC. The angle $\theta$ is therefore a measure of the ratio of intensity of the two beams of radiation.

Appropriate mechanical linkage may be employed to effect the phase correction of the reference signal and, if properly arranged and adapted to position the adjustable stator means about the rotational axis of the chopping disc, the translation of the adjustable means will be proportional to the tangent of the angle by which the phase of the reference voltage is corrected.

Thus far, the present invention has been described in several forms which employ but one operation of beam switching or chopping. The principles of the present invention may, however, be applied to a system in which the beams being compared are successively switched and then chopped at some further point in the system.

The monochromator 14 of Fig. 1 may comprise a combination of apparatus such as is illustrated in Fig. 8. Radiation varying in intensity substantially as is shown by waveform A of Fig. 6 enters the monochromator 14 and passes through an entrance slit 40. The radiation entering the monochromator through the entrance slit 40 is reflected by a mirror 41 and directed to a dispersing element such as the prism 42. The dispersed radiation is reflected by a Littrow mirror 43 along a return path through the dispersing element 42. Such dispersed radiation has come to be known in the art as "first pass" radiation.

To accomplish further dispersion the radiation issuing from the dispersing element 42 is reflected by mirror 41 whence it is redirected to a mirror 44. The mirror 44 is positioned to reflect the radiation to a corner mirror comprised of reflective elements 45 and 46 which in coaction with mirrors 44 and 41 redirect the radiation along a return path generally paralleling that previously described from dispersing element 42 to corner mirrors 45 and 46, but in an opposite direction.

The radiation passes again through the dispersing element 42, is reflected by the Littrow mirror 43 and returned through the dispersing element 42. Such radiation is known in the art as "second pass" radiation. Upon emerging from the dispersing element for the last time, the radiation is reflected by mirror 41 to another mirror 47 positioned to direct the second pass radiation through an exit slit 48. A mirror 49 is placed in the path of the emergent radiation so as to direct it to a radiation-responsive means such as the detector 15 of Fig. 1.

Interposed between the corner mirrors 45 and 46 is a radiation-chopping device such as a disc 50 having radiation opaque sectors. The chopping device 50 which may be semicircular in shape and is driven by a motor 51 so as to chop the second pass radiation as shown in waveform B of Fig. 6. This operation is accomplished in synchronism with the beam-switching operation exemplified by waveform A of Fig. 6.

Figure 6:
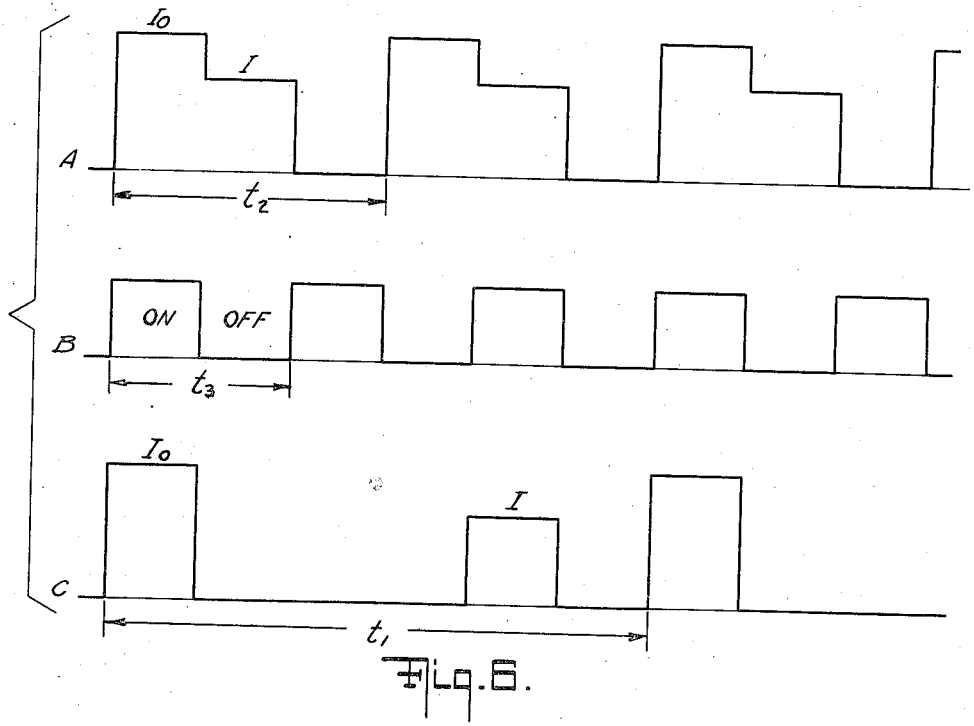
Fig. 6 is an illustration of the waveforms of signals developed in a variant embodiment of the present invention.

A great number of combinations of chopping discs and rotational speeds may be used to bring about the operations upon the radiation exemplified by waveforms A and B of Fig. 6. The particular configurations of each of the chopping elements 50 of Figs. 8 and 7 of Fig. 1 as well as their respective rotational speeds may be varied as desired or to suit convenience, but the remaining cooperative elements must be adapted or controlled accordingly to produce the essential phase and timing relationship as taught by the present invention. This type of operation is illustrated by the waveforms of Fig. 6 in which the radiation intensity signals $I_0$ and $I$ of the reference beam RB and the sample beam SB are shown against a time base. Waveform A illustrates the radiation signal which is developed from successive beam switching and the waveform B illustrates the additional chopping action which is interposed upon the radiation signals at a subsequent point in the system. The chopping action is an "on-off" operation as indicated and has no amplitude of its own, acting rather upon the radiation of waveform A. Waveform C illustrates the radiation signal from the compounded operations of beam-switching and chopping as illustrated by waveforms A and B which, it will be noted, has a fundamental frequency signal comprised of two components, one of which will vary in amplitude as the sample beam varies. The resultant fundamental frequency signal will, therefore, as in the other systems disclosed herein, have a phase which varies as the ratio of intensity of the radiation beams. If the fundamental frequency is designated as "$f$," the beam-switching should be accomplished at a frequency of $2f$, having a cyclic period of $t_2$ as indicated on waveform A, and the chopping should be accomplished at a frequency of $3f$ having a cyclic period of $t_3$ as indicated on waveform B.

Figure 7:
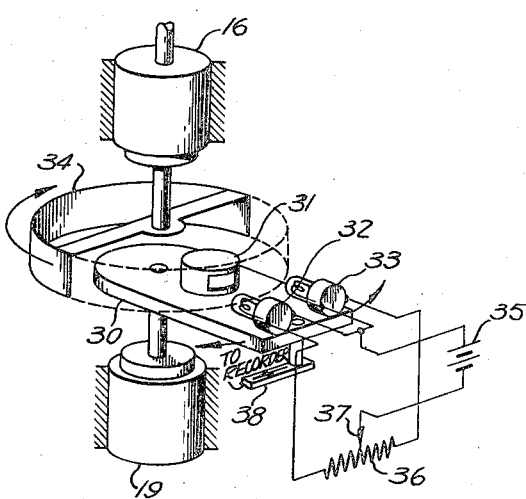
Fig. 7 is an illustration of an alternative form of reference signal generator which may be used in an embodiment of the present invention.

Fig. 7 schematically represents an arrangement for generating a reference signal which may be advantageously employed in an embodiment of the present invention. Positioned on a common base 30 are a photoelectric cell 31 and two sources of light such as the incandescent bulbs 32 and 33. A partially cut away cylindrical-shaped means 34 is driven by a motor 16 so as to intercept the light path from bulbs 32 and 33 to the photoelectric cell 31. The photoelectric cell 31 therefore receives a light signal which is chopped at the rotational frequency of the opaque means 34 and in synchronism with the beam-switching and beam-blocking operations effected by the drive motor 16. This light energy impinging upon the photocell 31 produces the reference signal of the system.

The base 30 is rotatably positioned by the servomotor 19 about the axis of the chopper drive motor 16 in response to the amplitude and sense of the signal received from the phase detector 18 of Fig. 1. The base 30 is positioned to adjust the phase of the reference signal thus produced so as to continuously maintain a predetermined phase relationship with the radiation intensity signal of the system.

In such an arrangement the base 30 may be, of course, mechanically linked to appropriate recording means and the linkage to the recording means be so adjusted that the translational movement transmitted thereby is proportional to the tangent of the angle by which the phase of the reference signal is corrected.

It will be noted that the reference signal generator illustrated in Fig. 7 has its two light sources, incandescent bulbs 32 and 33 connected to a battery 35 and in the circuit shown, adjustment of the variable tap 37 of a resistor 36 may be used to cause either one or the other of the incandescent bulbs 32 or 33 to emit more light than the other. This affords a fine adjustment of the phase of the reference signal thus developed and has the advantage that it is completely independent of any adjustment by mechanical displacement, rotation, or translation of the component parts of the reference signal generator.

I claim:

1. In a radiation comparison system, means for generating first and second beams of radiation, means for directing said beams on a common path, said last-named means being operative at the frequency "$f$" in accordance with a three-period cycle including a period during which said first beam is passed and said second beam is blocked, a period during which said first beam is blocked and said second beam is passed, and a period during which both said beams are blocked, means for generating a reference signal at the frequency "$f$," radiation-sensitive means positioned in said common path for producing a signal commensurate with the intensity of the radiation impinging thereon, phase detector means connected to receive said reference signal and said radiation intensity signal for producing a signal in response to the deviation of said received signals from a predetermined phase relationship, means responsive to said phase detector signal for adjusting the phase of said reference signal to maintain said predetermined phase relationship, whereby the amount of said phase adjustment is a direct measure of the ratio of intensity of said two beams.

2. In a radiation comparison system, means for generating first and second beams of radiation, means for directing said beams on a common path, said last-named means being operative at the frequency "$f$" in accordance with a three-period cycle including a period during which said first beam is passed and said second beam is blocked, a period during which said first beam is blocked and said second beam is passed, and a period during which both said beams are blocked, means for generating a reference signal at the frequency "$f$," radiation-sensitive means positioned in said common path for producing a signal commensurate with the intensity of the radiation impinging thereon, phase detector means connected to receive said reference signal and said radiation intensity signal for producing an output signal in response to the deviation of said received signals from a quadrature relationship, means responsive to said output signal for adjusting the phase of said reference signal to maintain said quadrature relationship, whereby the amount of said phase adjustment is a direct measure of the ratio of intensity of said two beams.

3. In a radiation comparison system, means for generating first and second beams of radiation, means for directing said beams on a common path, said last-named means being operative at the frequency "$f$" in accordance with a three-period cycle including a period during which said first beam is passed and said second beam is blocked, a period during which said first beam is blocked and said second beam is passed, and a period during which both said beams are blocked, adjustable means actuated by said last-named means for generating a reference signal at the frequency "$f$," radiation-sensitive means positioned in said common path for producing a signal commensurate with the intensity of the radiation impinging thereon, phase detector means connected to receive said reference signal and said radiation intensity signal for producing a signal in response to the deviation of said received signals from a predetermined phase relationship, means operatively connected to said reference signal generator and responsive to the phase detector output signal for adjusting the phase of said reference signal to maintain said predetermined phase relationship, whereby the amount of said phase adjustment is a direct measure of the ratio of intensity of said two beams.

4. In a radiation comparison system, means for generating first and second beams of radiation, means for directing said beams on a common path, said last-named means being operative at the frequency "$f$" in accordance with a three-period cycle including a period during which said first beam is passed and said second beam is blocked, a period during which said first beam is blocked and said second beam is passed, and a period during which both said beams are blocked, means for generating a reference signal at the frequency "$f$," including means driven in synchronism with said beam directing means and an adjustable stator adapted to produce a signal in response to relative motion therebetween, radiation-sensitive means positioned in said common path for producing a signal commensurate with the intensity of the radiation impinging thereon, phase detector means connected to receive said reference signal and said radiation intensity signal for producing an output signal in response to the deviation of said received signals from a predetermined phase relationship, means responsive to said output signal for adjustably positioning said stator to maintain said predetermined phase relationship, whereby the amount of said phase adjustment is a direct measure of the ratio of intensity of said two beams.

5. In a radiation comparison system, means for generating first and second beams of radiation, means for directing said beams on a common path, said last-named means being operative at the frequency "$f$" in accordance with a three-period cycle including a period during which said first beam is passed and said second beam is blocked, a period during which said first beam is blocked and said second beam is passed, and a period during which both said beams are blocked, means for generating a reference signal at the frequency "$f$," including means rotatably driven by said beam directing means and an adjustable stator adapted to produce a signal in response to relative motion therebetween, radiation-sensitive means positioned in said common path for producing a signal commensurate with the intensity of the radiation impinging thereon, phase detector means connected to receive said reference signal and said radiation intensity signal for producing an output signal in response to the deviation of said received signals from a predetermined phase relationship, means responsive to said output signal for continuously positioning said stator to maintain said predetermined phase relationship, whereby the amount of said phase adjustment is a direct measure of the ratio of intensity of said two beams.

6. In a radiation comparison system, means for generating first and second beams of radiation, means for directing said beams on a common path, said last-named means being operative at the frequency "$f$" in accordance with a three-period cycle including a period during which said first beam is passed and said second beam is blocked, a period during which said first beam is blocked and said second beam is passed, and a period during which both said beams are blocked, means operatively connected to said beam-directing means for generating an "*f*" frequency reference signal, radiation-sensitive means positioned in said common path for producing a signal commensurate with the intensity of the radiation impinging thereon, phase detector means connected to receive said reference signal and said radiation intensity signal for producing an output signal in response to the deviation of said received signals from a predetermined phase relationship, means responsive to said output signal for positioning the energy source relative to said reference signal generator to adjust the phase of said reference signal to maintain said predetermined phase relationship, whereby the amount of said phase adjustment is a direct measure of the ratio of intensity of said two beams.

7. In a radiation comparison system, means for generating first and second beams of radiation, means for directing said beams on a common path, said last-named means being operative at the frequency "*f*" in accordance with a three-period cycle including a period during which said first beam is passed and said second beam is passed, and a period during which both said beams are blocked, means for producing a magnetic field, an inductive element, means operatively connected with said beam-directing means for causing motion of said magnetic field relative to said inductive element whereby to produce a reference signal at the frequency "*f*," radiation-sensitive means positioned in said common path for producing a signal commensurate with the intensity of the radiation impinging thereon, phase detector means connected to receive said reference signal and said radiation intensity signal for producing an output signal in response to the deviation of said received signals from a predetermined phase relationship, means responsive to said output signal for adjustably positioning said inductive element to vary the phase of said reference signal so as to maintain said predetermined phase relationship, whereby the amount of said phase adjustment is a direct measure for the ratio of intensity of said two beams.

8. In a radiation comparison system, means for generating two beams of radiation, means for directing said beams to a common point, means for directing said beams on a common path including a disc rotated at the frequency "*f*" and positioned to intercept said common point, said disc having three sectors comprising a reflective portion, a non-reflective portion, and a portion transparent to the radiation, means for generating a reference signal at the frequency "*f*," radiation-sensitive means positioned in said common path for producing a signal commensurate with the intensity of the radiation impinging thereon, phase detector means connected to receive said reference signal and said radiation intensity signal for producing a signal in response to the deviation of said received signals from a predetermined phase relationship, means responsive to said phase difference signal for adjusting the phase of said reference signal to maintain said predetermined phase relationship, whereby the amount of said phase adjustment is a direct measure of the ratio of intensity of said two beams.

9. In a radiation comparison system, means for generating two beams of radiation, means for directing said beams to a common point, means for directing said beams on a common path including a disc rotated at the frequency "*f*" and positioned to intercept said common point, said disc having three sectors comprising a reflective portion of the order of 100° of its circumference, a non-reflective portion of the order of 100° of its circumference, and a portion transparent to the radiation of the order of 160° of its circumference, means for generating a reference signal at the frequency "*f*," radiation-sensitive means positioned in said common path for producing a signal commensurate with the intensity of the radiation impinging thereon, phase detector means connected to receive said reference signal and said radiation intensity signal for producing a signal in response to the deviation of said received signals from a predetermined phase relationship, means responsive to said phase difference signal for adjusting the phase of said reference signal to maintain said predetermined phase relationship, whereby the amount of said phase adjustment is a direct measure of the ratio of intensity of said two beams.

10. The method of obtaining a measure of the ratio of intensities of two beams of radiation which comprises the steps of chopping the beams so as to produce a cycle of operation during which each of the beams is successively blocked and then both beams are blocked, detecting the fundamental frequency of the radiation signals resulting therefrom, generating a reference signal in synchronism with the cycle of operation, comparing the phase of the reference signal with that of the fundamental frequency signal, adjusting the phase of the reference signal to maintain a predetermined phase relationship between the reference signal and the fundamental frequency signal, and measuring the amount of adjustment.

11. The method of obtaining a measure of the ratio of intensities of first and second beams of radiation which comprises the steps of blocking the first beam for the order of 100° of one cycle of operation, blocking the second beam for the order of 160° of one cycle of operation, blocking both beams for the order of 100° of one cycle of operation, detecting the fundamental frequency of the radiation signals resulting therefrom, generating a reference signal in synchronism with the cycle of operation, comparing the phase of the reference signal with that of the fundamental frequency signal, adjusting the phase of the reference signal to maintain a predetermined phase relationship between the reference signal and the fundamental frequency signal, and measuring the amount of adjustment.

12. In a radiation comparison system, means for generating first and second beams of radiation, means for directing said beams on a common path, said last-named means being operative at the frequency 2*f* in accordance with a three-period cycle including a period during which said first beam is passed and said second beam is blocked, a period during which said first beam is blocked and said second beam is passed, and a period during which both said beams are blocked, means for dispersing said radiation at least twice, means for chopping said multi-dispersed radiation at the frequency 3*f* in synchronism with said beam-directing means, means for detecting the "*f*" frequency component of said radiation, means for generating a reference signal at the frequency "*f*," phase detector means connected to receive said reference signal and the "*f*" frequency radiation signal for producing an output signal in response to the deviation of said received signals from a predetermined phase relationship, means responsive to said output signal for adjusting the phase of said reference signal to maintain said predetermined phase relationship, whereby the amount of said phase adjustment is a direct measure of the ratio of intensity of said two beams.

13. In a radiation comparison system, means for generating first and second beams of radiation, means for directing said beams on a common path, said last-named means being operative at the frequency 2*f* in accordance with a three-period cycle including a period during which said first beam is passed and said second beam is blocked, a period during which said first beam is blocked and said second beam is passed, and a period during which both said beams are blocked, means for dispersing said radiation at least twice, means for blocking said common path during alternate periods, means for detecting the "*f*" frequency component of said radiation, means for generating a reference signal at the frequency "*f*," phase detector means connected to receive said reference signal and the "*f*" frequency radiation signal for producing an output signal in response to the deviation of said received signals from a predetermined phase relationship, means responsive to said signal for adjusting the phase of said reference signal to maintain said predetermined phase relationship, whereby the amount of said phase adjustment is a direct measure of the ratio of intensity of said two beams.

14. In a radiation comparison system, means for generating first and second beams of radiation, means for directing said beams on a common path, said last-named means being operative at the frequency "$f$" in accordance with a three-period cycle including a period during which said first beam is passed and said second beam is blocked, a period during which said first beam is blocked and said second beam is passed, and a period during which both said beams are blocked, means for generating a reference signal at the frequency "$f$," radiation-sensitive means positioned in said common path for producing a signal commensurate with the intensity of the radiation impinging thereon, phase detector means connected to receive said reference signal and said radiation intensity signal for producing a signal as a function of the relative phase therebetween, whereby said last-named signal is a measure of the ratio of intensity of said two beams.

References Cited in the file of this patent

UNITED STATES PATENTS

| | | |
|---|---|---|
| 2,266,607 | Kaufmann | Dec. 16, 1941 |
| 2,549,402 | Vossberg | Apr. 17, 1951 |
| 2,651,771 | Palmer | Sept. 8, 1953 |
| 2,679,010 | Luft | May 18, 1954 |
| 2,679,185 | Atwood | May 25, 1954 |